US000002041H

(19) United States

(12) Statutory Invention Registration (10) Reg. No.: US H2041 H

Patel et al. (43) Published: Aug. 6, 2002

(54) WATER IMPERVIOUS CARPET BACKING

(75) Inventors: Kantilal Dahyabhai Patel, Loveland; Joel Muse, Jr., Hudson, both of OH (US)

(73) Assignee: The Goodyear Tire & Rubber Company, Akron, OH (US)

(21) Appl. No.: 08/847,295

(22) Filed: Apr. 24, 1997

(51) Int. Cl.[7] ..... B32B 3/02

(52) U.S. Cl. ..... 428/85; 428/95

(58) Field of Search ..... 428/95, 96, 97

(56) References Cited

U.S. PATENT DOCUMENTS

| | | | | | |
|---|---|---|---|---|---|
| 4,191,799 | A | * | 3/1980 | Gruber | 428/96 |
| 4,968,741 | A | | 11/1990 | Burroway et al. | 524/710 |
| 5,122,566 | A | | 6/1992 | Burroway et al. | 524/710 |
| 5,194,469 | A | | 3/1993 | Srail et al. | 524/166 |
| 5,230,940 | A | * | 7/1993 | Böhm et al. | 428/95 |
| 5,484,839 | A | * | 1/1996 | Wang et al. | 424/533 |
| 5,510,399 | A | * | 4/1996 | Sauer | 523/335 |

* cited by examiner

*Primary Examiner*—Michael J. Carone
*Assistant Examiner*—M. Thomson
(74) *Attorney, Agent, or Firm*—Alvin T Rockhill

(57) ABSTRACT

Aqueous liquids, such as water, can normally penetrate through conventional carpet. Thus, in cases where water is spilled on conventional carpet, it typically seeps through and ultimately reaches the flooring below. This trapped water can lead to bacterial or fungal growth which can further cause odors and/or deterioration of the carpet backing or flooring. This invention relates to a technique for treating carpet to render it impervious to aqueous liquids. This invention specifically discloses a process for treating carpet which is comprised of a pile and a backing to render said carpet impervious to aqueous liquids, said process comprising the steps of (1) coating the bottom side of said backing with a water-resistant coating composition which is comprised of (i) a latex of a polymer which is comprised of repeat units which are derived from (a) about 30 weight percent to about 84 weight percent vinyl aromatic moochers, (b) about 15 weight percent to about 65 weight percent alkyl acrylate moochers and (c) about 1 weight percent to about 6 weight percent unsaturated carbonyl group containing moochers, (ii) a coalescing solvent and (iii) a thickener; and (2) allowing the water-resistant coating composition to dry on the bottom side of said backing to produce the treated carpet which is impervious to aqueous liquids.

19 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

WATER IMPERVIOUS CARPET BACKING

BACKGROUND OF THE INVENTION

The most widely used method for laminating carpet pile to carpet backing involves the application of a carpet latex formulation to the surfaces of the backing and/or the piles being bonded together. It should be noted that the pile is normally mechanically bound to a primary backing to form a pile composite which is referred to herein as simply the pile. The coated innerface of the two surfaces (the pile composite and the carpet backing) are brought together and the whole composite including the pile portion of the construction is normally sent through large ovens. The heat treatment in the ovens serves the dual purpose of driving off the water contained in the latex compound and simultaneously curing the latex to effect a lamination of the pile to the backing. Upon exiting from the ovens, the finished carpet composite is cooled and taken up on large storage rolls.

The textile backing utilized in manufacturing carpet, particularly tufted carpets, is a loosely woven fabric of natural or synthetic fibrous materials, such as jute or polypropylene. The pile is normally manufactured with a tufting machine wherein the individual fiber filaments are pulled or punched through the interstices of a textile layer such that a portion of the individual filaments extend below the plane of the first textile layer. These portions of the individual filaments or tufts must be locked or bonded into position so that the tufts do not pull out during the service life of the carpet. The backing is superposed over substantially all of the pile with the carpet latex composition interposed between the two layers. The general purpose of the backing is to protect the exposed ends of the tufts and also to add additional dimensional stability to the finished carpet structure.

Aqueous liquids (such as water, carpet shampoos and beverages) can normally penetrate through the carpet backing to the flooring below. Thus, in cases where water or beverages are spilled on conventional carpet, the liquid typically seeps through and ultimately reaches the flooring below. Unfortunately, the carpet structure itself hinders the clean-up of the spilled liquid. This trapped liquid can lead to bacterial or fungal growth which can further cause odors and/or deterioration of the carpet backing or flooring.

SUMMARY OF THE INVENTION

This invention relates to a technique for treating carpet to render it impervious to aqueous liquids. This invention specifically discloses a process for treating carpet which is comprised of a pile and a backing to render said carpet impervious to aqueous liquids, said process comprising the steps of (1) coating the bottom side of said backing with a water-resistant coating composition which is comprised of (i) a latex of a polymer which is comprised of repeat units which are derived from (a) about 30 weight percent to about 84 weight percent vinyl aromatic moochers, (b) about 15 weight percent to about 65 weight percent alkyl acrylate moochers and (c) about 1 weight percent to about 6 weight percent unsaturated carbonyl group containing moochers, (ii) a coalescing solvent and (iii) a thickener; and (2) allowing the water-resistant coating composition to dry on the bottom side of said backing to produce the treated carpet which is impervious to aqueous liquids.

The present invention also reveals a process for treating carpet which is comprised of a pile and a backing to render said carpet impervious to aqueous liquids, said process comprising the steps of (1) coating the bottom side of said backing with a water-resistant coating composition which is comprised of (i) a latex of a polymer which is comprised of repeat units which are derived from (a) about 30 weight percent to about 84 weight percent vinyl aromatic moochers, (b) about 15 weight percent to about 60 weight percent alkyl acrylate moochers and (c) about 1 weight percent to about 6 weight percent unsaturated carbonyl group containing moochers, (ii) a coalescing solvent and (iii) a thickener; and (2) allowing the water-resistant coating composition to dry on the bottom side of said backing to produce the treated carpet which is impervious to aqueous liquids.

DETAILED DESCRIPTION OF THE INVENTION

The technique of this invention simply involves applying a water-resistant coating composition to the backing of the carpet being treated and allowing the coating composition to dry. In other words, the coating composition is applied to the side of the carpet which is designed to come in contact with flooring. This is, of course, the "bottom side" of the backing. The pile is accordingly bonded to the other side of the backing which can be referred to as the "top side" of the backing.

Numerous techniques can be employed for the purpose of applying the water-resistant coating composition to the bottom side of the backing. For instance, the coating composition can be sprayed, brushed or rolled onto the carpet backing. However, it is important for the entire surface of the backing to be coated and for the coating to be done as uniformly as possible.

The water-resistant coating composition is comprised of (i) a latex of a polymer which is comprised of repeat units which are derived from (a) about 30 weight percent to about 84 weight percent vinyl aromatic moochers, (b) about 15 weight percent to about 65 weight percent alkyl acrylate moochers and (c) about 1 weight percent to about 6 weight percent unsaturated carbonyl group containing moochers, (ii) a coalescing solvent and (iii) a thickener. The water-resistant coating composition can also optionally contain a plasticizer and/or pigments.

The water-resistant coating composition will typically contain from about 10 phr to about 40 phr of the coalescing solvent. The term "phr" as used in this patent application stands for "parts per 100 parts by weight of resin" with the resin being the dry weight of the resin in the latex. It is normally preferred for the water-resistant coating composition to contain from about 15 phr to about 35 phr of the coalescing solvent. The coalescing solvent used can, of course, be a mixture of two or more organic solvents. The coalescing solvent will be at least water-miscible and is preferably water-soluble. Of the various coalescing solvents which can be used, ethylene glycol monobutyl ether, ethylene glycol monoethyl ether, diethylene glycol monomethyl ether, diethylene glycol monoethyl ether and diethylene glycol monobutyl ether are preferred.

The water-resistant coating composition will typically contain from about 10 phr to about 80 phr of the thickener. The water-resistant coating composition will preferably contain from about 20 phr to about 60 phr of the thickener and will most preferably contain from about 30 phr to about 50 phr of the thickener. The thickener can be any of a wide variety of rheological additives. For instance, the thickener can be a cellulosic thickener, a urethane thickener, an acrylic thickener, a clay thickener or a silica thickener. Hectorite clay is a representative example of a highly preferred thickener for utilization in the water-resistant coating composition. It is a swelling and gelling clay of the approximate formula $Na_{0.67}(Mg,Li)_6Si_8O_{20}(OH,F)_4$. Fumed silica is another representative example of a highly preferred thickener.

Pigments can optionally be included in the water-resistant coating composition to provide the carpet backing with a desired color. Any pigment which is conventionally used in making water-based paints can be employed in making color imparting water-resistant coating compositions. Some representative examples of pigments which can be utilized include inorganic pigments such as, titanium dioxide, red iron oxide, yellow iron oxide, iron oxide black, metallic phthalocyanine blue and phthalocyanine green.

The water-resistant coating composition will optionally contain a plasticizer. The plasticizer will typically be present in the water-resistant coating composition in an amount which is within the range of 0 phr to about 20 phr. The plasticizer will more typically be present in the water-resistant coating composition in an amount which is within the range of about 5 phr to about 15 phr. It is generally preferred for the water-resistant coating composition to contain from about 8 phr to about 12 phr of the plasticizer.

A wide variety of plasticizers which are compatible with water-based paint formulations can be employed. It is desirable for the plasticizer to be a liquid at room temperature (about 25° C.) and have a sufficiently high boiling point, preferably at least 100° C., and even more preferably, at least 150° C., so that they do not volatilize from the paint formulation when applied to a substrate. Indeed, the plasticizer should enhance the water insolubility of a dried coating of the coalesced resin. Further, the plasticizer, or mixture of plasticizers, must be characterized by being compatible with the resin itself. For this characterization, a solubility parameter in the range of about 8 to about 16 is required. Such solubility parameter is of the type described in The Encyclopedia of Polymer Science and Technology, Volume 3, page 854, 1965, John Wiley and Sons, Inc, which is simply determined by the equation $$\sigma=(\Sigma F)/V=F/MW/d$$

where $\sigma$=solubility parameter

F=sum of the pertinent molar attraction constants of groups determined by Small, P A [(J Appl Chem 3, 71, (1953)]

V=Molar volume at 25° C.

MW=molecular weight d=density at 25° C.

Various plasticizers can be used for this purpose. They can, for example, be of the type listed in the Federation Series on Coatings Technology, Unit Twenty-two, entitled "Plasticizers," published April 1974, so long as they fulfill the melting point, boiling point and compatibility requirements. Representative of various plasticizers are cyclic plasticizers such as phosphoric acid esters, phthalic anhydride esters and trimellitic acid esters. Some specific examples of suitable plasticizers which can be used include: N-cyclohexyl-p-toluene sulfonamide, dibenzyl sebacate, diethylene glycol dibenzoate, dipropane diol dibenzoate, N-ethyl-p-toluene sulfonamide, isopropylidenediphenoxypropanol, alkylated naphthalene, polyethylene glycol dibenzoate, o-p-toluene sulfonamide, trimethylpentanediol dibenzoate, di-t-octylphenylether and trimethylpentanediol monoisobutyrate monobenzoate.

Representative of various acyclic plasticizers are adipic acid esters, azelaic acid esters, citric acid esters, acetylcitric acid esters, myristic acid esters, phosphoric acid esters, ricinoleic acid esters, acetylricinoleic acid esters, sebacic acid esters, stearic acid esters, epoxidized esters, as well as 1,4-butane diol dicaprylate, butoxyethyl pelargonate, di[(butoxyethoxy)ethoxy] methane, dibutyl tartrate, diethylene glycol dipelargonate, diisooctyl diglycolate, isodecyl nonanoate, tetraethylene glycol di(2-ethylbutyrate), triethylene glycol di(2-ethyl-hexanoate), triethylene glycol dipelargonate and 2,2,4-trimethyl-1,3-pentane diol diisobutyrate.

Additional various plasticizers, cyclic, acyclic and otherwise, include chlorinated paraffins, hydrogenated terphenyls, substituted phenols, propylene glycols, polypropylene glycol esters, polyethylene glycol esters, melamines, epoxidized soys, oils, melamines, liquid, hydrogenated abietate esters, epoxytallate esters, alkyl phthalyl alkyl glycolates, sulfonamides, sebacate esters, aromatic epoxies, aliphatic epoxies, liquid poly($\alpha$-methyl styrene), maleate esters, mellitate esters, benzoates, benzyl esters, tartrates, succinates, isophthalates, orthophthalates, butyrates, fumarates, glutarates, dicaprylates, dibenzoates and dibenzyl esters. It is to be appreciated that relatively low molecular weight polymers and copolymers derived from monoolefins containing 4 to 6 carbon atoms, mixtures of diolefins and monoolefins containing 4 to 6 carbon atoms as well as such hydrocarbons and hydrocarbon mixtures with styrene and/or $\alpha$-methyl styrene can also be used.

The preferred esters are prepared from the reaction of carboxylic and dicarboxylic acids including fatty acids, such as the phthalic acids, benzoic acid, dibenzoic acid, adipic acid, sebacic acid, stearic acid, maleic acid, tartaric acid, succinic acid, butyric acid, fumaric acid and glutaric acid with hydrocarbon diols, preferably saturated hydrocarbon diols, having about 7 to 13 carbon atoms.

Representative of various phosphoric acid esters are cresyl diphenyl phosphate, tricresyl phosphate, dibutyl phenyl phosphate, diphenyl octyl phosphate, methyl diphenyl phosphate, tributyl phosphate, triphenyl phosphate, tri(2-butoxyethyl) phosphate, tri(2-chloroethyl) phosphate, tri-2 (chloropropyl) phosphate and trioctyl phosphate.

Representative of various phthalic anhydride esters are butyl octyl phthalate, butyl 2-ethylhexyl phthalate, butyl n-octyl phthalate, dibutyl phthalate, diethyl phthalate, diisodecyl phthalate, dimethyl phthalate, dioctyl phthalates, di(2-ethylhexyl) phthalate, diiso-octyl phthalate, di-tridecyl phthalate, n-hexyl n-decyl phthalate, n-octyl n-decyl phthalate, alkyl benzyl phthalate, bis(4-methyl-2-pentyl) phthalate, butyl benzyl phthalate, butyl cyclohexyl phthalate, di(2-butoxyethyl) phthalate, dicyclohexyl isodecyl phthalate, dicyclohexyl phthalate, diethyl isophthalate, di n-heptyl phthalate, dihexyl phthalate, diisononyl phthalate, di(2-methoxyethyl) phthalate, dimethyl isophthalate, dinonyl phthalate, dioctyl phthalates, dicapryl phthalate, di(2-ethylhexyl) isophthalate, mixed dioctyl phthalates, diphenyl phthalate, 2-(ethylhexyl) isobutyl phthalate, polypropylene glycol bis(amyl) phthalate, hexyl isodecyl phthalate, isodecyl tridecyl phthalate and iso-octyl isodecyl phthalate.

Representative of trimellitic acid esters are triisooctyl trimellitate, tri-n-octyl n-decyl trimellitate, trioctyl trimellitate, tri(2-ethylhexyl) trimellitate, di-n-hexyl n-decyl trimellitate, tri-n-hexyl trimellitate, triisodecyl trimellitate and triisononyl trimellitate.

Representative of various adipic acid esters are di(2-ethylhexyl) adipate, diisodecyl adipate, dioctyl adipates (including diisooctyl adipate) n-hexyl n-decyl adipate, n-octyl n-decyl adipate and di-n-heptyl adipate.

Representative examples of sebacic acid esters are dibutyl sebacate, di(2-ethylhexyl) sebacate, dibutoxyethyl sebacate, diiso-octyl sebacate and diisopropyl sebacate.

The latices which can be utilized in making the water-resistant coating compositions of this invention are prepared by free radical emulsion polymerization. The techniques described in U.S. Pat. No. 4,968,741, U.S. Pat. No. 5,122,566 and U.S. Pat. No. 5,194,469 can be employed in synthesizing such latices. The teachings of these references are accordingly incorporated herein by reference in their entirety.

The charge compositions used in the preparation of such neutralized latices by the technique of U.S. Pat. No. 4,968,741 contain moochers, at least one phosphate ester surfactant, at least one water-insoluble nonionic surface active agent and at least one free radical initiator. The monomer charge composition used in such polymerizations is comprised of (a) from about 45 to about 85 weight percent vinyl aromatic moochers, (b) from about 15 to about 50 weight percent of at least one alkyl acrylate monomer and (c) from about 1 to about 6 weight percent of at least one unsaturated carbonyl compound. It is preferred for the polymer being synthesized to be comprised of from about 60 to about 80 weight percent vinyl aromatic moochers, from about 20 to about 40 weight percent alkyl acrylate moochers and from about 1.5 to about 5 weight percent unsaturated carbonyl compounds. It is more preferred for the polymer to be comprised of from about 65 weight percent to 75 weight percent vinyl aromatic moochers, from about 22 to about 30 weight percent alkyl acrylate moochers and from about 2 to about 4 weight percent unsaturated carbonyl compounds.

Some representative examples of vinyl aromatic moochers which can be used include styrene, alpha-methyl styrene and vinyl toluene. Styrene and alpha-methyl styrene are the preferred vinyl aromatic monomers. Due to its relatively low cost, styrene is the most preferred vinyl aromatic monomer. The alkyl acrylate monomers which can be employed have alkyl moieties which contain from 2 to about 10 carbon atoms. The alkyl acrylate monomer will preferably have an alkyl moiety which contains from 3 to 5 carbon atoms. Normal butyl acrylate is a highly preferred alkyl acrylate monomer. Some representative examples of unsaturated carbonyl compounds which can be utilized include acrylic acid, methacrylic acid, fumaric acid, itaconic acid, maleic acid and maleic anhydride. The preferred unsaturated carbonyl compounds include acrylic acid, methacrylic acid, fumaric acid and itaconic acid. Acrylic acid and methacrylic acid are the most preferred unsaturated carbonyl compounds. In most cases, it is advantageous to use a combination of both acrylic acid and methacrylic acid as the unsaturated carbonyl compound component used in making the latex. For instance, the utilization of about 1 to about 3 weight percent acrylic acid with about 0.5 to about 1.5 weight percent methacrylic acid results in the latex having improved freeze-thaw stability. For example, the utilization of about 2 percent acrylic acid with 1 percent methacrylic acid as the unsaturated carbonyl compound component results in the latex produced being capable of withstanding more than five (5) freeze-thaw cycles. It is important for latices which are shipped through cold regions of the world to have this improved freeze-thaw stability.

The charge composition used in the preparation of the neutralized latex will contain a substantial quantity of water. The ratio between the total amount of monomers present in the charge composition and water can range between about 0.2:1 and about 1.2:1. It is generally preferred for the ratio of monomers to water in the charge composition to be within the range of about 0.8:1 and about 1.1:1. For instance, it is very satisfactory to utilize a ratio of monomers to water in the charge composition of about 1:1.

The charge composition will also contain from about 0.5 phm (parts per hundred parts of monomer) to about 4.0 phm of at least one phosphate ester surfactant. It is normally preferred for the phosphate-ester surfactant to be present in the polymerization medium at a level within the range of about 1 phm to about 3.5 phm. It is generally more preferred for the charge composition to contain from about 2 to about 3 phm of the phosphate ester surfactant.

The phosphate ester surfactants that are useful in this invention are commercially available from a wide variety of sources. For instance, GAF Corporation sells phosphate ester surfactants under the tradename of Gafac™ RE-410, Gafax™ CD-169 and Gafax™ DP-100. Some other phosphate-ester surfactants that are commercially available include Indoil™ (BASF Wyandotte Corporation), Emphos™ (Witco Chemical Corporation), Cyclophos™ (Cyclochemicals Corporation), Tryfac™ (Emery Industries) and Alcamet™ (Lonza, Inc).

The phosphate ester surfactants used in making the neutralized latex can have the structural formula:

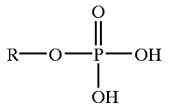

wherein R is an alkyl group or an aryl group. As a general rule, R will contain from about 4 to about 40 carbon atoms. It is preferred for such phosphate ester surfactants to be in the form of partially neutralized salts. Monobasic salts and nonionic compounds can be utilized as well as such dibasic salts. For example, Gafac™ RE-410, which is a preferred phosphate ester surfactant, is a complex mixture of (1) a dibasic salt having the structural formula:

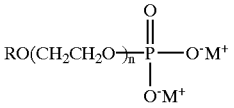

(2) a monobasic salt having the structural formula:

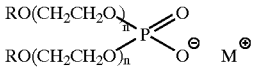

and (3) a nonionic compound having the structural formula:

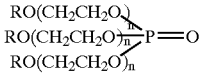

In the case of Gafac™ RE-410, n is 4 and R represents nonyl phenol.

The charge composition used in the preparation of the latex also contains from about 0.5 phm to about 4 phm of at least one water-insoluble nonionic surface active agent. The water-insoluble nonionic surface active agent will preferably be present in the polymerization medium at a level within the range of about 1 phm to about 3.5 phm and will more preferably be present in an amount ranging from about 2 phm to about 3 phm. The water-insoluble nonionic surface active agent will normally be a fatty alcohol or a nonionic surfactant.

The fatty alcohol utilized will typically be of the structural formula R-OH wherein R represents an alkyl group containing from 5 to 22 carbon atoms. In most cases, R will be an alkyl group containing from 10 to 18 carbon atoms. It is generally preferred for the fatty alcohol to contain from 12 to 14 carbon atoms. For instance, lauryl alcohol is a particularly preferred fatty alcohol.

The nonionic surfactants which can be utilized as the water-insoluble nonionic surface active agent will normally have a hydrophile-lipophile balance (HLB) number of less than about 12. It is generally preferred for such nonionic surfactants to have an HLB number of less than about 10. HLB numbers are indicative of a surfactant's emulsification behavior and relate to the balance between the hydrophilic and lipophilic (hydrophobic) portions of the molecule. HLB numbers are further described in Griffin, W. C., J. Soc. Cosmet. Chem. 1, 311 (1949) which is incorporated herein by reference. The HLB number of a given surfactant generally decreases with increasing temperatures. The HLB numbers referred to herein are determined or calculated for the reaction temperature employed.

Water-insoluble nonionic surfactants which contain low levels (from 1 to about 8) ethylene oxide repeat units can be employed. These water-insoluble nonionic surfactants can have the structural formula:

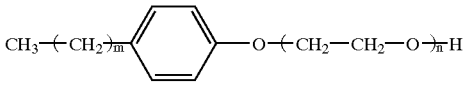

wherein n is an integer from 1 to about 8 and wherein m is an integer from about 6 to about 12. It is normally preferred for m to be 8 or 9. The HLB number of such compounds increases with increasing levels of ethylene oxide incorporation. The HLB number of such compounds increases as a function of n as follows:

| n | HLB Number |
|---|---|
| 1 | 3.6 |
| 3 | 7.8 |
| 4 | 10.4 |
| 10 | 13.5 |
| 16 | 15.8 |
| 30 | 17.3 |
| 40 | 17.9 |

Polyols which are copolymers of ethylene oxide and propylene oxide can also be employed as the water-insoluble nonionic surfactant. Such polyols have the structural formula:

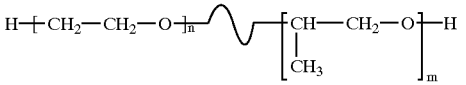

wherein n and m are integers, wherein the ratio of m to n is at least about 5:1 and wherein

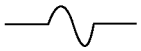

indicates that the distribution of monomeric units can be random. The polyols which can be used also have molecular weights of at least about 1500. The polyols which are preferred contain less than about 10 percent bound ethylene oxide (have a ratio of m to n of at least about 10:1).

The free radical aqueous emulsion polymerizations used in preparing the neutralized latex are initiated with at least one free radical generator. The free radical generator is normally employed at a concentration within the range of about 0.01 phm to about 1 phm. The free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl peroxide, methyl ethyl ketone peroxide, succinic acid peroxide, dicetyl peroxydicarbonate, t-butyl peroxyacetate, t-butyl peroxymaleic acid, t-butyl peroxybenzoate, acetyl cyclohexyl sulfonyl peroxide and the like; the various azo compounds such as 2-t-butylazo-2-cyanopropane, dimethyl azodiisobutyrate, azodiisobutylronitrile, 2-t-butylazo-1-cyanocyclohexane, 1-t-amylazo-1-cyanocyclohexane and the like, the various alkyl perketals, such as 2,2-bis-(t-butylperoxy)butane, and the like. Water-soluble peroxygen-free radical initiators are especially useful in such aqueous polymerizations.

The emulsion polymerizations employed in making the neutralized latex are typically carried out at the temperature ranging between about 125° F. (52° C.) and 190° F. (88° C.). At temperatures above about 88° C., alkyl acrylate monomers, such as butyl acrylate, have a tendency to boil. Thus, a pressurized jacket would be required for heating such alkyl acrylate monomers to temperatures in excess of about 88° C. On the other hand, the polymerization reaction proceeds at a very slow rate at temperatures below about 52° C. The slow rate of polymerization experienced at temperatures below about 52° C. results in the polymer having a nonuniform distribution of repeat units in its backbone. The slow rates of polymerization experienced at such low temperatures are also undesirable because they greatly reduce the throughput of the polymerization reactor.

It is generally preferred for the polymerization temperature to be maintained within the range of about 150° F. (66° C.) to 180° F. (82° C.). It is generally more preferred for the reaction temperature to be controlled within the range of about 160° F. (71° C.) to about 170° F. (77° C.). It is important for the polymerization to be conducted at a pH which is below about 3.5 so that a water-sensitive polymer is not produced. It is preferred for the pH of the polymerization medium to be maintained at a level of about 3.0 or less throughout the polymerization. As the polymerization proceeds, the pH of the polymerization medium will drop naturally. Thus, good results can be attained by adjusting the pH of the initial monomer charge composition to within the range of about 3.0 to about 3.5 and allowing the polymerization to proceed. In such a case, the final pH of the polymerization medium will be about 1.5 which is highly satisfactory.

In commercial operations, it is typically desirable to add about 15 percent to about 25 percent of the monomers in an initial charge. The initial charge is then allowed to react for a period of about 30 minutes to about 60 minutes. Then, the balance of the monomers to be charged can be continuously charged into the reaction zone at a rate which is sufficient to maintain a reaction temperature within the desired temperature range. By continuously adding the monomers to the reaction medium while maintaining a relatively constant reaction temperature, very uniform polymers can be prepared.

After the desired degree of monomer conversion has been attained, a conventional shortstopping agent, such as hydroquinone, can be added to the polymerization medium to end the polymerization. The polymerization will typically be allowed to continue until a high level conversion has been achieved. In most cases, the monomer conversion reached will be at least about 80 percent with monomer conversions of at least about 90 percent being preferred.

After the polymerization has optionally been shortstopped, it is generally desirable to neutralize the latex to a pH which is within the range of 7 to 10.5 and subsequently to strip unreacted monomers from the emulsion. It is normally preferred for the latex to be neutralized to a pH within the range of 8 to 10 and more preferred for the latex to be neutralized to a pH within the range of about 9.0 to about 9.5. This can be accomplished using conventional techniques such as the addition of a strong base, such as sodium hydroxide or ammonium hydroxide followed by steam-stripping. It is normally highly preferred to adjust the pH of the latex by the addition of ammonium hydroxide. After any stripping operations have been completed, the antioxidant can be added to the emulsion to produce a stabilized latex.

Virtually any type of antioxidant can be utilized for this purpose. For instance, any antioxidant can be used which is capable of rendering the polymer less susceptible to oxidative attack by chemically interrupting the autoxidation process by which the polymer is oxidatively degraded. More specifically, the antioxidant can be a chain-breaking antioxidant, a peroxide-decomposing antioxidant, an ultraviolet screening agent, a triplet quencher or a metal deactivator.

The latex formed can be diluted with additional water to the concentration (solids content) that is desired. The latex will typically have a solids content which is within the range of about 20 percent to about 60 percent. The latex will preferably have a solids content which is within the range of about 35 percent to about 55 percent. It will more preferably have a solids content which is within the range of about 45 percent to about 55 percent. Neutralized latices which are suitable for use in making the water-resistant coating formulations of this invention are sold by The Goodyear Tire & Rubber Company as Pliotec® 7104 latex, Pliotec® 7217 latex and Pliotec® LS2 latex.

The water-resistant coating compound is allowed to dry on the backing which makes the carpet impervious to water. This is normally done by passing the carpet through a drying oven or a series of drying ovens. During this drying process, the water in the water-resistant coating compound evaporates leaving a dry water-resistant coating on the carpet backing. After substantially all of the water has evaporated from the coating compound, the carpet manufacturing process is completed.

This invention is illustrated by the following examples which are merely for the purpose of illustration and are not to be regarded as limiting the scope of the invention or the manner in which it can be practiced. Unless specifically indicated otherwise, parts and percentages are given by weight.

EXAMPLE

In this experiment, carpet was treated to make it impervious to water utilizing the technique of this invention. A water-resistant coating composition was made by first mixing 48 pounds (21.8 kg) of propycellosolve, 34.8 pounds (15.8 kg) of methylcellosolve, 11.6 pounds (5.3 kg) of butyldipropasol and 22 pounds of Kodaflex™ TXIB plasticizer together to produce a solvent solution. Then, 319 pounds (144.7 kg) of Pliotec® 7104 latex and 255 pounds (115.7 kg) of Pliotec® 7217 latex was mixed into the solvent solution to make a latex solution. Finally, 60 pounds (27.2 kg) of Syloid™ 74 fumed silica was mixed into the latex solution to produce a first water-resistant coating formulation.

A second water-resistant coating formulation was made by first mixing 48 pounds (21.8 kg) of propycellosolve, 34.8 pounds (15.8 kg) of methylcellosolve, 11.6 pounds (5.3 kg) of butyldipropasol and 22 pounds of Kodaflex™ TXIB plasticizer together to produce a solvent solution. Then, 319 pounds (144.7 kg) of Pliotec® 7104 latex was mixed into the solvent solution to make a latex solution. Finally, 60 pounds (27.2 kg) of Syloid™ 74 fumed silica was mixed into the latex solution to produce the second water-resistant coating formulation.

The first water-resistant coating composition was applied to the backing on the bottom side of a conventional carpet and the carpet was allowed to air dry for 5 minutes. Then, the second water-resistant coating composition was applied to the backing on the bottom side of the carpet. The second coating composition was allowed to dry and the treated carpet was evaluated for water resistance by pouring 4 ounces (118 ml) of water onto a 6-inch by 6-inch (15.2 cm×15.2 cm) piece of the carpet. There was no water penetration through the carpet after a period of 2.5 hours. However, the water immediately penetrated through an identical piece of untreated carpet. Thus, this experiment shows that the technique of this invention can be employed to render carpet impervious to water.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. Carpet which is impervious to water which is comprised of a backing and a pile which is bonded to the top side of said backing, wherein the bottom side of said backing is coated with a polymer which is comprised of repeat units which are derived from (a) about 30 weight percent to about 84 weight percent vinyl aromatic monomers, (b) about 15 weight percent to about 65 weight percent alkyl acrylate monomers and (c) about 1 weight percent to about 6 weight percent unsaturated carbonyl group containing monomers.

2. A process for treating carpet which is comprised of a pile and a backing to render said carpet impervious to aqueous liquids, said process comprising the steps of (1) coating the bottom side of said backing with a water-resistant coating composition which is comprised of (i) a latex of a polymer which is comprised of repeat units which are derived from (a) about 30 weight percent to about 84 weight percent vinyl aromatic monomers, (b) about 15 weight percent to about 65 weight percent alkyl acrylate monomers and (c) about 1 weight percent to about 6 weight percent unsaturated carbonyl group containing monomers, (ii) a coalescing solvent and (iii) a thickener; and (2) allowing the water-resistant coating composition to dry on the bottom side of said backing to produce the treated carpet which is impervious to aqueous liquids.

3. A process as specified in claim 2 wherein said water-resistant coating composition contains from about 10 phr to about 40 phr of said coalescing solvent.

4. A process as specified in claim 3 wherein said water-resistant coating composition contains from about 10 phr to about 80 phr of said thickener.

5. A process as specified in claim 4 wherein said water-resistant coating composition is further comprised of a plasticizer.

6. A process as specified in claim 5 wherein said water-resistant coating composition contains up to about 20 phr of said plasticizer.

7. A process as specified in claim 6 wherein said water-resistant coating composition contains from about 15 phr to about 35 phr of said coalescing solvent.

8. A process as specified in claim 7 wherein said coalescing solvent is selected from the group consisting of ethylene glycol monobutyl ether, ethylene glycol monoethyl ether, diethylene glycol monomethyl ether, diethylene glycol monoethyl ether and diethylene glycol monobutyl ether.

9. A process as specified in claim 7 wherein said water-resistant coating composition contains from about 20 phr to about 60 phr of said thickener.

10. A process as specified in claim 7 wherein said water-resistant coating composition contains from about 30 phr to about 50 phr of said thickener.

11. A process as specified in claim 7 wherein said water-resistant coating composition contains from about 5 phr to about 15 phr of said plasticizer.

12. A process as specified in claim 7 wherein said water-resistant coating composition contains from about 8 phr to about 12 phr of said plasticizer.

13. A process as specified in claim 11 wherein said plasticizer is a liquid at room temperature and has a boiling point of at least 100° C.

14. A process as specified in claim 13 wherein said plasticizer has a boiling point of at least 150° C.

15. A process as specified in claim 7 wherein said latex contains a phosphate ester surfactant.

16. A process as specified in claim 15 wherein said latex contains a water-insoluble nonionic surface active agent.

17. A process as specified in claim 16 wherein said water-insoluble nonionic surface active agent is a fatty alcohol of the structural formula R-OH, wherein R represents an alkyl group containing from 5 to 22 carbon atoms.

18. A process as specified in claim 16 wherein said water-insoluble nonionic surface active agent is a nonionic surfactant having a hydrophile-lipophile balance number of less than about 12.

19. A process as specified in claim 16 wherein said water-insoluble nonionic surface active agent is a polyol having a molecular weight of at least about 1500.

* * * * *